(12) United States Patent
Lin

(10) Patent No.: US 8,104,593 B2
(45) Date of Patent: Jan. 31, 2012

(54) RESILIENT SHOCK-ABSORBING DEVICE

(76) Inventor: Keng-Hsien Lin, Kaohsiung (TW)

( * ) Notice: Subject to any disclaimer, the term of this patent is extended or adjusted under 35 U.S.C. 154(b) by 424 days.

(21) Appl. No.: 12/500,468

(22) Filed: Jul. 9, 2009

(65) Prior Publication Data

US 2009/0266663 A1    Oct. 29, 2009

Related U.S. Application Data

(63) Continuation-in-part of application No. 12/074,487, filed on Mar. 3, 2008, now abandoned.

(51) Int. Cl.
*F16F 7/12* (2006.01)

(52) U.S. Cl. ............ 188/372; 267/145; 267/152; 2/410; 2/412

(58) Field of Classification Search ............ 267/136, 267/140, 142, 145, 152, 153; 188/372, 378; 2/412, 410
See application file for complete search history.

(56) References Cited

U.S. PATENT DOCUMENTS

| | | | |
|---|---|---|---|
| 4,002,315 A * | 1/1977 | Van Goubergen | 248/633 |
| 5,330,165 A * | 7/1994 | van Goubergen | 267/141 |
| 6,029,962 A * | 2/2000 | Shorten et al. | 267/145 |
| 6,777,062 B2 * | 8/2004 | Skaja | 428/143 |
| 2006/0059606 A1 * | 3/2006 | Ferrara | 2/412 |

* cited by examiner

*Primary Examiner* — Christopher Schwartz

(74) *Attorney, Agent, or Firm* — Kilpatrick Townsend & Stockton LLP

(57) ABSTRACT

A resilient shock-absorbing device includes an absorber body having a first absorber layer including a plurality of longitudinal first outer tube halves heat-sealed to each other and each having two transversely opposed first longitudinal ends contacting respectively adjacent first longitudinal ends of two adjacent first outer tube halves, and a plurality of first heat-seal seams each interconnecting two adjacent first longitudinal ends that contact each other, and a second absorber layer including a plurality of longitudinal second outer tube halves heat-sealed to each other and each having two transversely opposed second longitudinal ends contacting respectively adjacent second longitudinal ends of two adjacent second outer tube halves, and a plurality of second heat-seal seams each extending longitudinally and interconnecting two adjacent second longitudinal ends that contact each other. A plurality of first and second foam members are respectively filled in the first and second outer tube halves.

16 Claims, 6 Drawing Sheets

RESILIENT SHOCK-ABSORBING DEVICE

CROSS-REFERENCE TO RELATED APPLICATION

This application is a continuation-in-part of U.S. patent application Ser. No. 12/074,487, filed by the applicant on Mar. 3, 2008, the entire disclosure of which is incorporated herein by reference.

BACKGROUND OF THE INVENTION

1. Field of the Invention

This invention relates to a shock-absorbing device that can be applied to various fields.

2. Description of the Related Art

Referring to FIG. 1, a conventional safety helmet 1 includes an outer protective layer 11, an inner protective layer 12, a hollow intermediate layer 13 formed between the inner and outer protective layers 12, 11, and a plurality of buffering strips 14 filled in the intermediate layer 13. The buffering strips 14 are generally made of foam or Styrofoam, and are fixed within the intermediate layer 13 through an adhesive. Air is then introduced into the intermediate layer 13, so that through the buffering strips 14 and the air in the intermediate layer 13, the safety helmet 1 can absorb shocks generated upon impact with external forces. However, when the safety helmet 1 is subjected to an excessive external impact, the buffering strips 14 offer minimal protection due to the fact that they are made of foam or Styrofoam. In addition, the air introduced into the intermediate layer 13 may leak therefrom. Thus, after the outer protective layer 11 receives an external impact, the impact force is easily transmitted to the inner protective layer 12 of the safety helmet 1, so that the user's head, particularly portions thereof that are in contact with the inner protective layer 12, is likely to be jarred or injured. Further, since the inner protective layer 12 is usually made of fabric material, when the user perspires, e.g., as a result of intense exercise, the user's sweat easily permeates into the buffering strips 14 through the inner protective layer 12, so that the safety helmet 1 produces a peculiar odor that is difficult to remove.

U.S. Pat. No. 6,029,962 discloses a shock-absorbing device having a plurality of deformable shock-absorbing upper and lower halves of hemispherical cup-shape which are formed by indenting an elastomeric sheet or plate via a molding process so that the upper and lower halves are interconnected. U.S. Pat. No. 6,777,062 discloses similar deformable shock-absorbing upper and lower halves which, however, are filled with shock-absorbing fillers. U.S. Pat. Nos. 5,330,165 and 4,002,315 disclose a plurality of spaced-apart deformable longitudinal projections formed by molding an elastomeric sheet or plate so that the projections are interconnected.

SUMMARY OF THE INVENTION

Therefore, the object of the present invention is to provide a resilient shock-absorbing device having a plurality of deformable resilient shock-absorbing longitudinal tube halves which are heat-sealed together.

According to this invention, a resilient shock-absorbing device comprises an absorber body having top and bottom faces and including first and second absorber layers. The first absorber layer has the top face, and includes a plurality of longitudinal resilient first outer tube halves of substantially arc-shaped cross section juxtaposed in parallel and heat-sealed to each other, a plurality of first heat-seal seams, and a plurality of first foam members filled respectively in the first outer tube halves and each having a surface exposed from a respective one of the first outer tube halves. Each first outer tube half has two transversely opposed first longitudinal ends contacting directly and respectively adjacent first longitudinal ends of two adjacent first outer tube halves. Each first heat-seal seam extends longitudinally, and interconnects two adjacent first longitudinal ends that contact each other. The second absorber layer has the bottom face, and includes a plurality of longitudinal resilient second outer tube halves of substantially arc-shaped cross section juxtaposed in parallel and heat-sealed to each other, a plurality of second heat-seal seams, and a plurality of second foam members filled respectively in the second outer tube halves and each having a surface exposed from a respective one of the second outer tube halves. Each second outer tube half has two transversely opposed second longitudinal ends contacting directly and respectively adjacent second longitudinal ends of two adjacent second outer tube halves. Each second heat-seal seam extends longitudinally, and interconnects two adjacent second longitudinal ends that contact each other. Each of the first and second outer tube halves is made of a thermoplastic elastic material.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
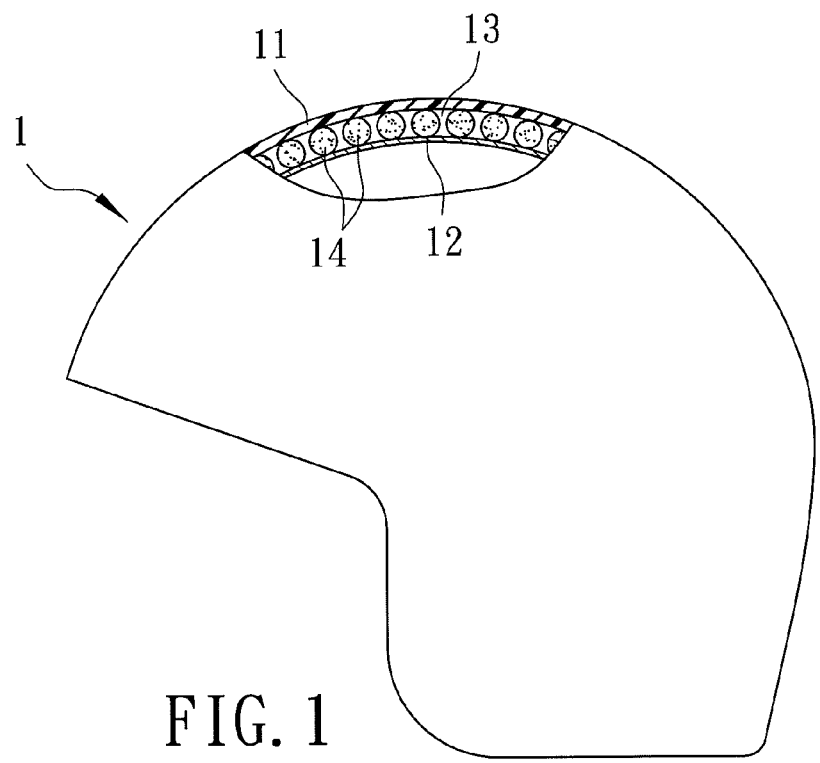
FIG. 1 is a schematic view of a conventional safety helmet, with a portion thereof removed for clarity's sake.

Before the present invention is described in greater detail, it should be noted that the same reference numerals have been used to denote like elements throughout the specification.

Figure 2:
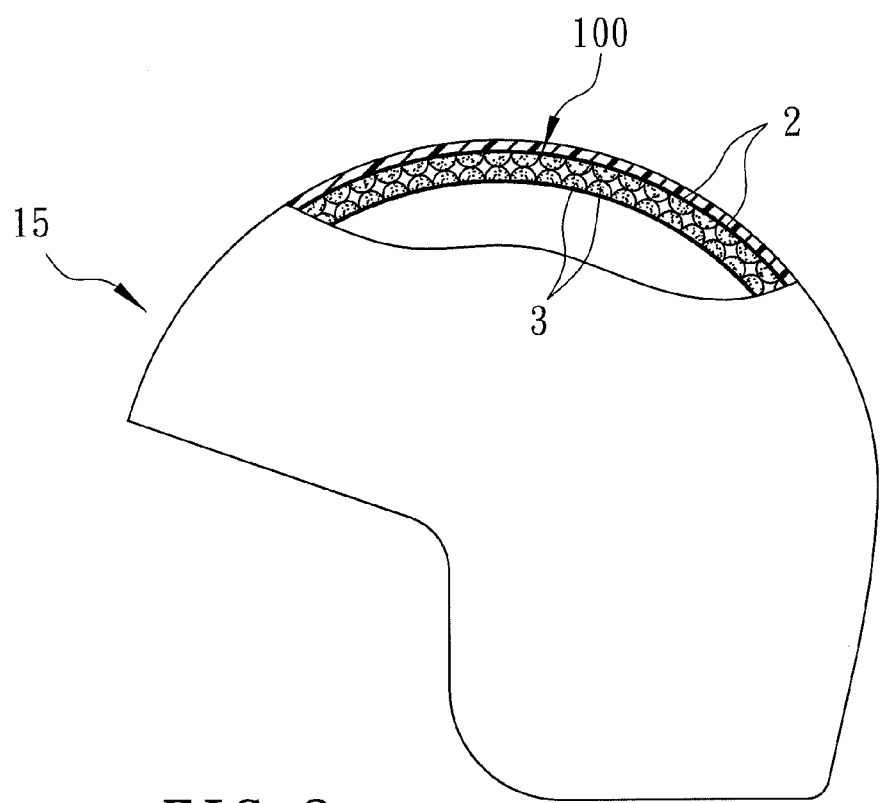
FIG. 2 is a schematic view of a safety helmet incorporating a resilient shock-absorbing device according to the first preferred embodiment of the present invention, with a portion of the safety helmet removed for clarity's sake.
Figure 3:
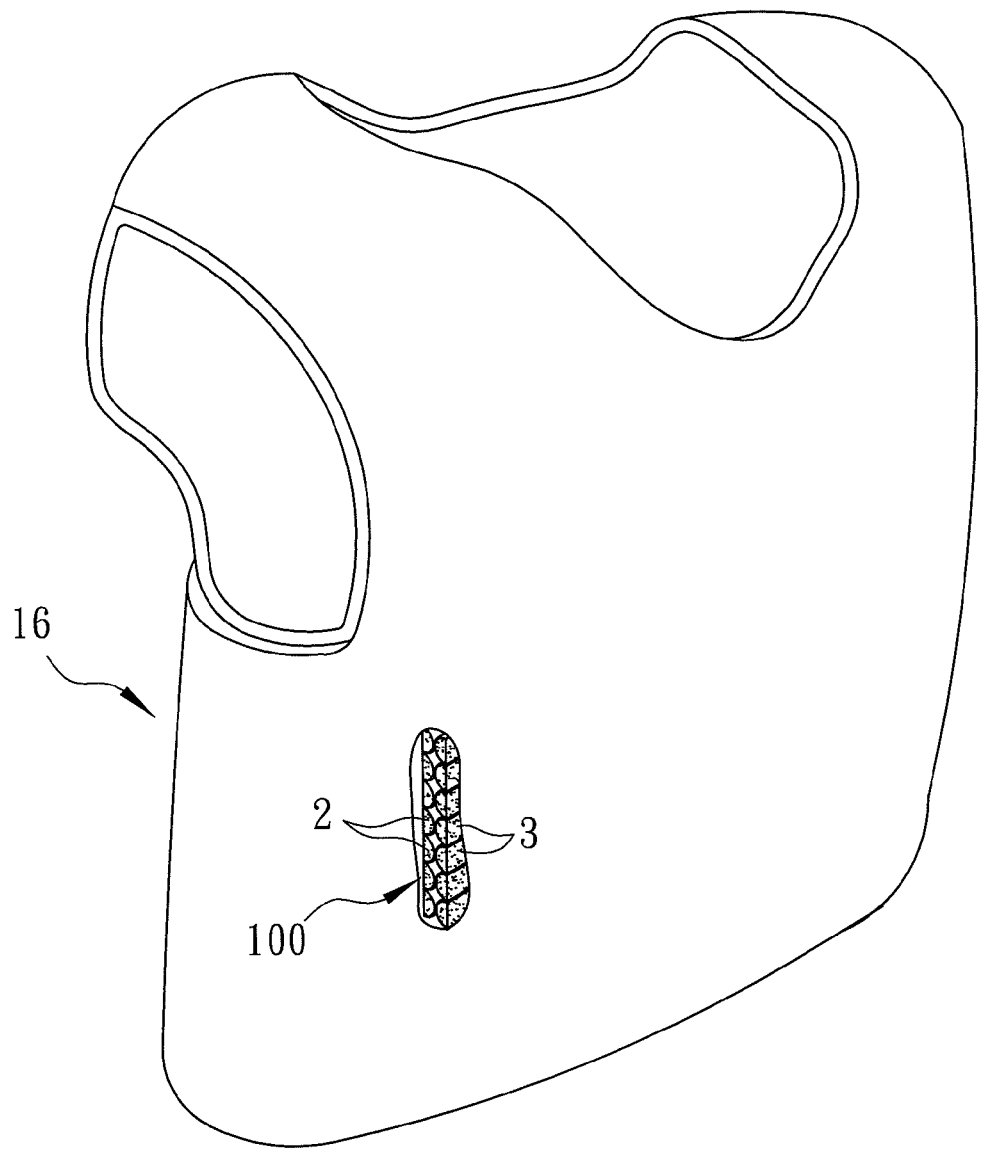
FIG. 3 is a perspective view of a protective suit incorporating the resilient shock-absorbing device of the first preferred embodiment, with a portion of the protective suit removed for clarity's sake.

A resilient shock-absorbing device according to the first preferred embodiment of the present invention is adapted to be incorporated in a shell body of a safety helmet 15, as shown in FIG. 2, or in a protective suit 16, as shown in FIG. 3, to provide the safety helmet 15 or the protective suit 16 with good buffering and shock-absorbing effects. Hence, the resilient shock-absorbing device of the present invention may be applied to various fields, and the present invention is not limited to the disclosed application.

Figure 4:
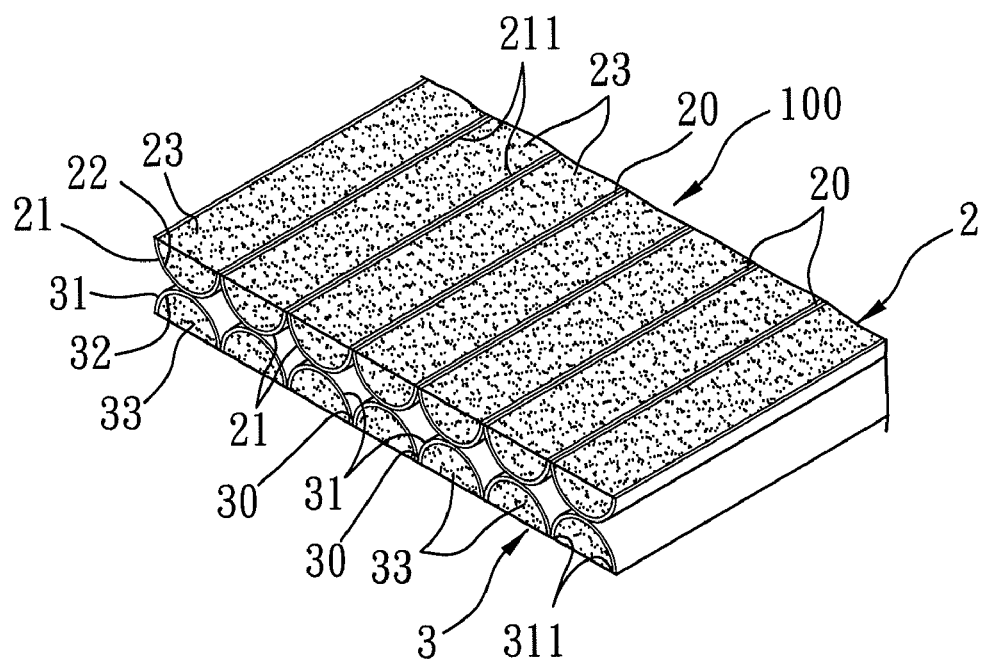
FIG. 4 is a perspective view of the first preferred embodiment.

Referring to FIG. 4, the first preferred embodiment of the resilient shock-absorbing device of the present invention is shown to comprise an absorber body 100 having top and bottom faces and including first and second absorber layers 2, 3. The first absorber layer 2 includes a plurality of longitudinal deformable resilient first outer tube halves 21 of substantially arc-shaped cross section juxtaposed in parallel and heat-sealed to each other and each defining a receiving space 22, a plurality of first heat-seal seams 20, and a plurality of first foam members 23 filled respectively in the receiving spaces 22 of the first outer tube halves 21 and each having a surface exposed from a respective first outer tube half 21. Each first outer tube half 21 has two transversely opposed first longitudinal ends 211 contacting directly and respectively adjacent first longitudinal ends 211 of two adjacent first outer tube halves 21. Each first heat-seal seam 20 extends longitudinally, and interconnects two adjacent first longitudinal ends 211 that contact each other. The top face of the absorber body 100 includes the surfaces of the first foam members 23.

The second absorber layer 3 is similar in construction to the first absorber layer 2. Particularly, the second absorber layer 3 includes a plurality of longitudinal deformable resilient second outer tube halves 31 of substantially arc-shaped cross section juxtaposed in parallel and heat-sealed to each other and each defining a receiving space 32, a plurality of second heat-seal seams 30, and a plurality of second foam members 33 disposed respectively in the receiving spaces 32 of the second outer tube halves 31 and each having a surface exposed from a respective second outer tube half 31. Each second outer tube half 31 has two transversely opposed second longitudinal ends 311 contacting directly and respectively adjacent second longitudinal ends 311 of two adjacent second outer tube halves 31. Each second heat-seal seam 30 extends longitudinally, and interconnects two adjacent second longitudinal ends 311 that contact each other. The bottom face of the absorber body 100 includes the surfaces of the second foam members 33.

Figure 5:
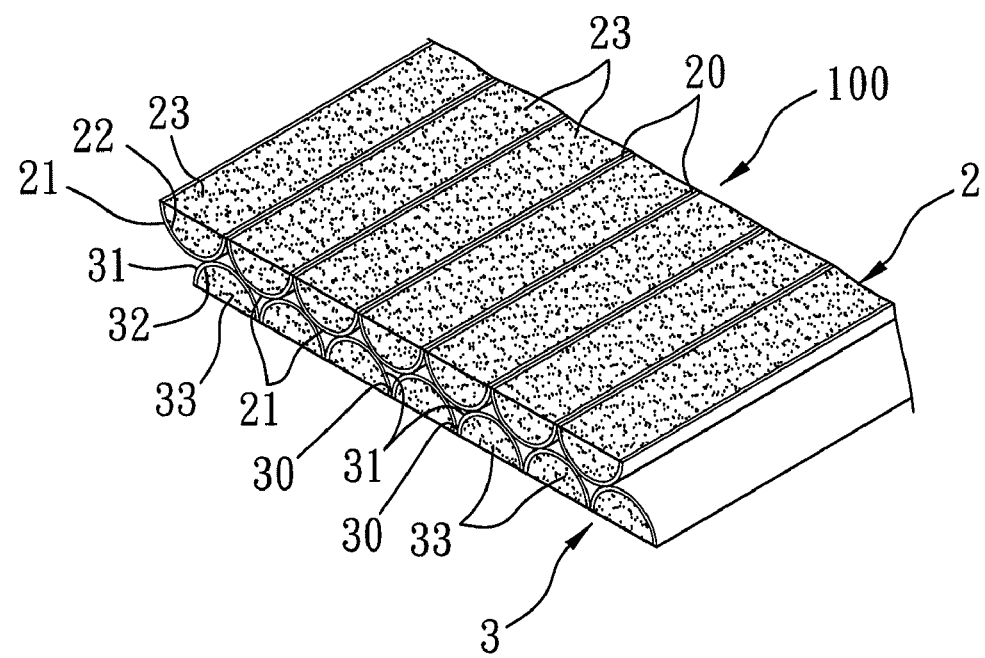
FIG. 5 is a perspective view of an alternative form of the first preferred embodiment.

In this embodiment, each of the first outer tube halves 21 is heat-sealed to and is aligned with an adjacent one of the second outer tube halves 31 in a top-to-bottom direction. Alternatively, each of the first outer tube halves 21 may be heat-sealed to and may be staggered with respect to an adjacent one of the second outer tube halves 31 in a top-to-bottom direction, as shown in FIG. 5. Each of the first and second outer tube halves 21, 31 is made of a thermoplastic elastic material, and has a hardness ranging from 55 ShoreA to 85 ShoreD. The thermoplastic elastic material is thermoplastic polyurethane.

In this embodiment, each of the first foam members 23 does not project out of the respective first outer tube half 21. However, in actual practice, each first foam member 23 may project out of the respective first outer tube half 21. Each of the first and second foam members 23, 33 is made of thermoplastic polyurethane, and has a density ranging from 0.2 g/cm$^3$ to 0.6 g/cm$^3$. However, in actual practice, each of the first and second foam members 23 may be made of a soft material selected from the group consisting of thermoplastic elastomer (TPE), polyurethane (PU), natural rubber, silicone rubber, and a combination thereof.

Since the first outer tube halves 21 of the first absorber layer 2 and the second outer tube halves 31 of the second absorber layer 3 are made of the same material, they can be tightly bonded to each other dispensing with the need of an adhesive, and are therefore not easily separated. Further, because the first and second absorber layers 2, 3 are parallel and are connected to each other through the first and second outer tube halves 21, 31, when the absorber body 100 is subjected to an external pressing force, the first and second outer tube halves 21, 31 will bend and deform according to the strength and direction of the applied pressure so as to provide good buffering and shock-absorbing effects. Moreover, through the presence of the first and second foam members 23, 33 in the respective first and second outer tube halves 21, 31, when an external force is greater than the supporting forces of the first and second outer tube halves 21, 31, the first and second foam members 23, 33 can provide an additional supporting force against the external force, thereby enhancing the shock-absorbing and buffering effects of the absorber body 100 of the resilient shock-absorbing device of the present invention.

Figure 6:
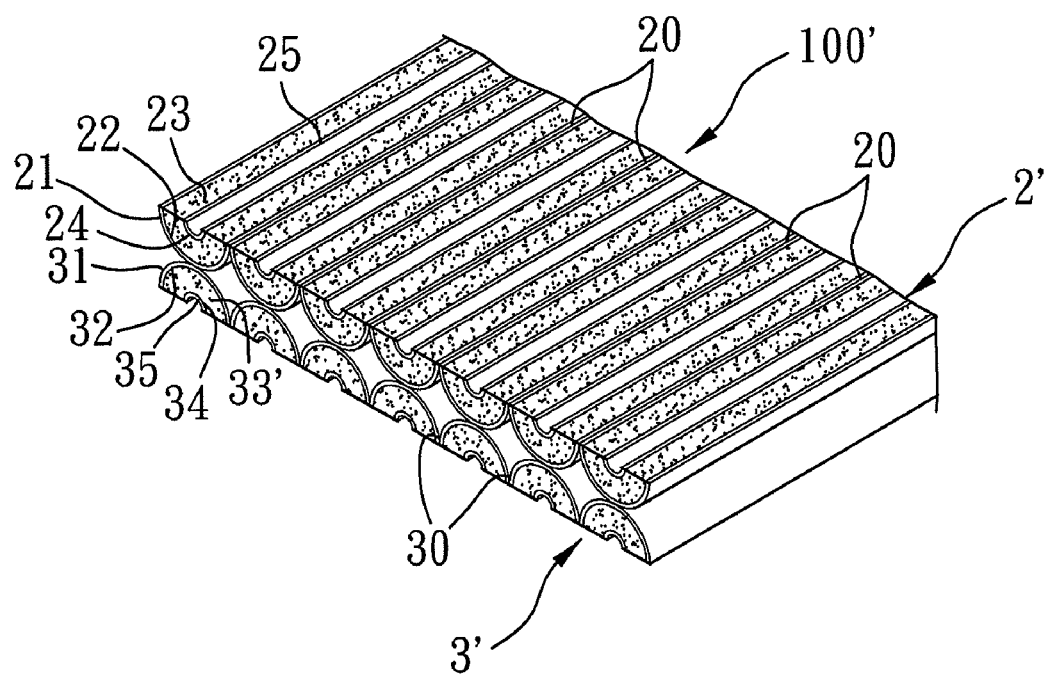
FIG. 6 is a perspective view of a resilient shock-absorbing device according to the second preferred embodiment of the present invention.

Referring to FIG. 6, a resilient shock-absorbing device according to the second preferred embodiment of the present invention is shown to be similar to the first preferred embodiment. However, in this embodiment, the surface of each of the first foam members 23' is formed with a first indentation 24 of semi-circular cross section that extends along the length thereof, and the surface of each of the second foam members 33' is formed with a second indentation 34 of semi-circular cross section that extends along the length thereof. The first absorber layer 2' further includes a plurality of first inner tube halves 25 disposed in the first indentations 24 of the respective first foam members 23' and each having a semi-circular cross section. The second absorber layer 3' further includes a plurality of second inner tube halves 35 disposed in the second indentations 34 of the respective second foam members 33' and each having a semi-circular cross section. Each of the first and second inner tube halves 25, 35 is made of thermoplastic polyurethane, and has a hardness ranging from 55 ShoreA to 85 ShoreD.

Through the presence of the relatively tough first and second inner tube halves 25, 35 in the respective first and second indentations 24, 34 of the first and second foam members 23', 33', the supporting effect of the entire absorber body 100' of the shock-absorbing device of the present invention is strengthened. When an external force is greater than the limiting supporting forces of the first and second outer tube halves 21, 31 and the first and second foam members 23', 33', the first and second inner tube halves 25, 35 can provide an additional supporting force against the external force, thereby enhancing the supporting effect of the absorber body 100' of the shock-absorbing device of the present invention.

Figure 7:
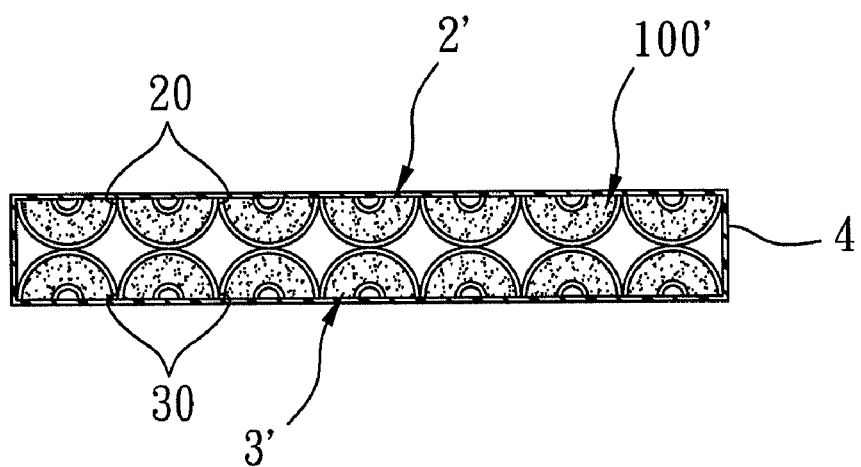
FIG. 7 is a perspective view of a resilient shock-absorbing device according to the third preferred embodiment of the present invention.

Referring to FIG. 7, a resilient shock-absorbing device according to the third preferred embodiment of the present invention is shown to be similar to the second preferred embodiment. However, in this embodiment, the shock-absorbing device of the present invention further comprises a cover layer 4 that envelops the superimposed first and second absorber layers 2', 3' of the absorber body 100'. The cover layer 4 is made of thermoplastic polyurethane, and has a hardness ranging from 55 ShoreA to 85 ShoreD.

Through the presence of the cover layer 4, the entire structure of the resilient shock-absorbing device of the present invention is strengthened, so that not only can each of the first and second absorber layers 2', 3' be prevented from being excessively pressed, but also the stability and durability of the same can be enhanced. Further, the cover layer 4 is a waterproof breathable (water-liquid impermeable and liquid-vapor permeable) film, so that when the user perspires after intense exercise, sweat is prevented from seeping easily into the absorber body 100' of the shock-absorbing device of the present invention. Moreover, the resilient shock-absorbing device of the present invention can be easily cleaned through its waterproof feature. Hence, the resilient shock-absorbing device of the present invention is suitable for use in the protective suit 16 of an athlete, and is very suitable for use in products that require higher supporting and shock-absorbing effects.

Figure 8:
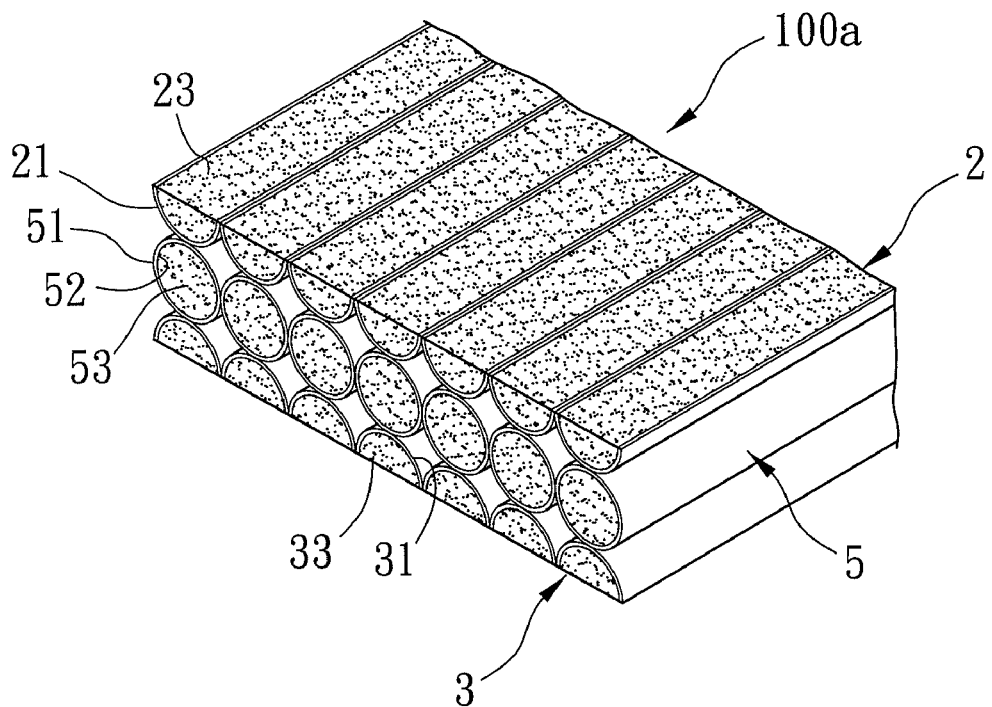
FIG. 8 is a perspective view of a resilient shock-absorbing device according to the fourth preferred embodiment of the present invention.

Referring to FIG. 8, a resilient shock-absorbing device according to the fourth preferred embodiment of the present invention is shown to be similar to the first preferred embodiment. However, in this embodiment, the absorber body (100a) further includes a third absorber layer 5 connected between the first and second absorber layers 2, 3. The third absorber layer 5 includes a plurality of longitudinal deformable resilient third outer tubes 51 juxtaposed in parallel and heat-sealed to each other and each defining a receiving space 52, and a plurality of third foam members 53 received respectively in the receiving spaces 52 of the third outer tubes 51. Each third outer tube 51 is made of thermoplastic polyurethane, and has a hardness ranging from 55 ShoreA to 85 ShoreD. Each third foam member 53 is also made of thermoplastic polyurethane, and has a density ranging from 0.2 g/cm$^3$ to 0.6 g/cm$^3$. However, in actual practice, each third foam member 53 may be made of a soft material selected from the group consisting of thermoplastic elastomer (TPE), polyurethane (PU), natural rubber, silicone rubber, and a combination thereof.

Each third outer tube 51 is heat-sealed to and aligned with an adjacent one of the first outer tube halves 21 and an adjacent one of the second outer tube halves 31 in a top-to-bottom direction. However, the arrangement of the first and second outer tube halves 21, 31 and the third outer tubes 51 may be altered as desired.

Since the third outer tubes 51 are made of thermoplastic polyurethane and are connected between the respective first and second outer tube halves 21, 31, when an external force is greater than the limiting supporting forces of the first and second outer tube halves 21, 31 and the first and second foam members 23, 33, the third outer tubes 51 can provide an additional supporting force against the external force, thereby enhancing the buffering and shock-absorbing effects of the resilient shock-absorbing device of the present invention.

Figure 9:
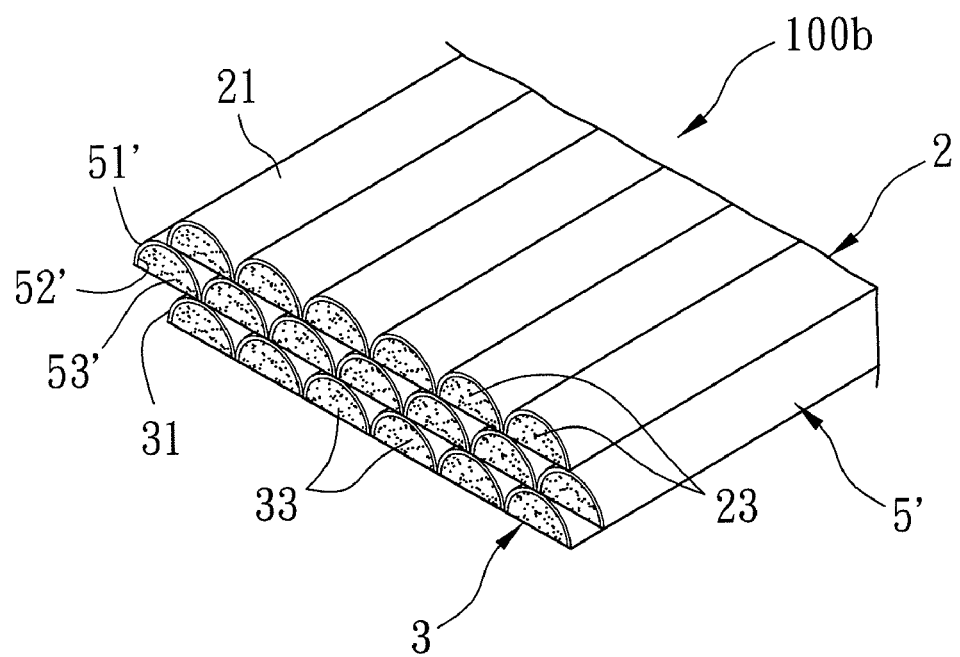
FIG. 9 is a perspective view of a resilient shock-absorbing device according to the fifth preferred embodiment of the present invention.

Referring to FIG. 9, a resilient shock-absorbing device according to the fifth preferred embodiment of the present invention is shown to be similar to the fourth preferred embodiment. However, in this embodiment, the third absorber layer 5' of the absorber body (100b) includes a plurality of longitudinal resilient third outer tube halves 51' of substantially arc-shaped cross section juxtaposed in parallel and heat-sealed to each other and each defining a semi-circular receiving space 52', and a plurality of fourth foam members 53' disposed respectively in the receiving spaces 52' of the third outer tube halves 51'. The top face of the absorber body (100b), in this embodiment, includes outer curved surfaces of the first outer tube halves 21 that are opposite to the surfaces of the first foam members 23 which are exposed from the first outer tube halves 21. The bottom face of the absorber body (100b), in this embodiment, includes the surfaces of the second foam members 33 which are exposed from the second outer tube halves 31. Each third outer tube half 51' is made of thermoplastic polyurethane, and is heat-sealed to and is staggered with respect to an adjacent one of the first outer tube halves 21 and an adjacent one of the second outer tube halves 31 in a top-to-bottom direction. Through such an arrangement, gaps among the first to third outer tube halves 21, 31, 51' can be minimized to thereby result in a denser structure of the entire shock-absorbing device of the present invention. As such, the supporting force and the buffering and shock-absorbing effects of the shock-absorbing device of the present invention can be enhanced.

Figure 10:
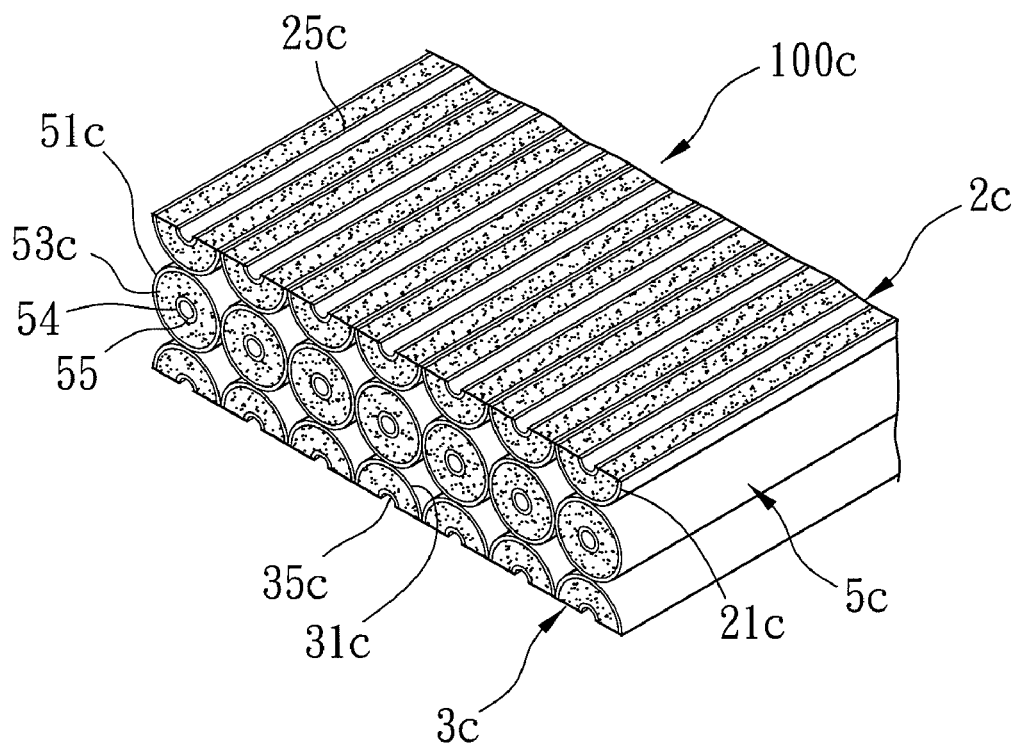
FIG. 10 is a perspective view of a resilient shock-absorbing device according to the sixth preferred embodiment of the present invention.

Referring to FIG. 10, a resilient shock-absorbing device according to the sixth preferred embodiment of the present invention is shown to be similar to the fourth preferred embodiment. However, in this embodiment, each of the third foam members (53c) has a central hole 54 that extends along the length thereof. The third absorber layer (5c) of the absorber body (100c) further includes a plurality of third inner tubes 54 disposed respectively in the central holes 54 of the third foam members (53c). Each of the third inner tubes 54 is made of thermoplastic polyurethane, and has a hardness ranging from 55 ShoreA to 85 ShoreD. Each of the first and second absorber layers (2c, 3c) is similar in construction to the first and second absorber layers 2', 3' (see FIG. 6) described in the second preferred embodiment of the shock-absorbing device of the present invention. The supporting effect of the entire shock-absorbing device of the present invention is strengthened through the presence of the relatively tough third inner tubes 55, such that when an external force is greater than the supporting forces of the first and second outer tube halves (21c, 31c) and the third tubes (51c), the first and second inner tube halves (25c, 35c) and the third inner tubes 55 can provide an additional supporting force against the external force, thereby enhancing the shock-absorbing and buffering effects of the resilient shock-absorbing device of the present invention.

Figure 11:
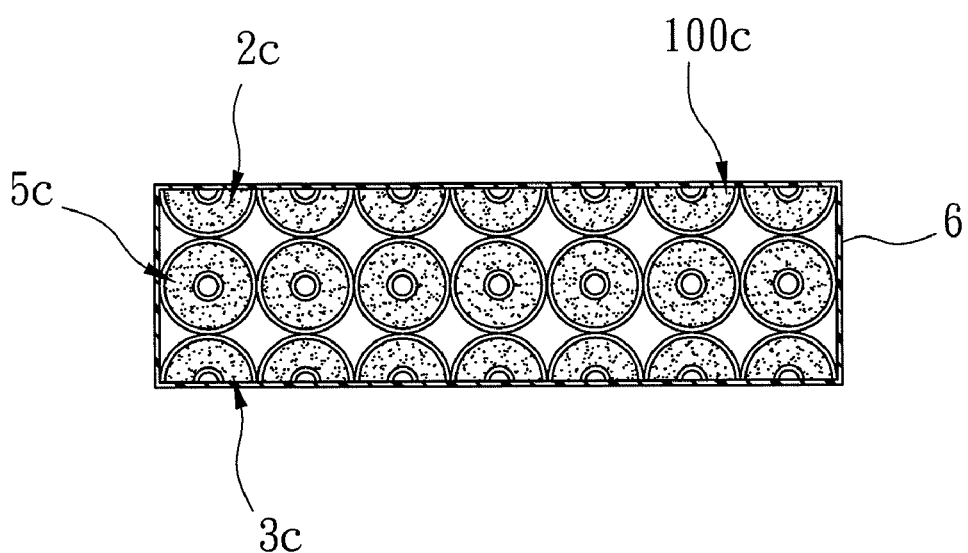
FIG. 11 is a perspective view of a resilient shock-absorbing device according to the seventh preferred embodiment of the present invention.

Referring to FIG. 11, a resilient shock-absorbing device according to the seventh preferred embodiment of the present invention is shown to be similar to the sixth preferred embodiment. However, in this embodiment, the resilient shock-absorbing device further comprises a cover layer 6 that envelops the first to third absorber layers (2c, 3c, 5c) of the absorber body (100c). The cover layer 6 is similar in construction to the cover layer 4 (see FIG. 7) of the third preferred embodiment. Particularly, the cover layer 6 is made of thermoplastic polyurethane, has a hardness ranging from 55 ShoreA to 85 ShoreD, and can enhance stability and durability of the first to third absorber layers (2c, 3c, 5c). Further, the cover layer 6 is also a waterproof breathable (water-liquid impermeable and liquid-vapor permeable) film that can prevent the sweat of the user from seeping into the resilient shock-absorbing device of the present invention, and that can permit easy cleaning of the resilient shock-absorbing device of the present invention.

Other advantages of the present invention may be summarized as follows:

1. Since the thermoplastic polyurethane used in the resilient shock-absorbing device of the present invention is a recyclable material that may be reused and that can be decomposed, protection of the environment is achieved by using this material.

2. Since the resilient shock-absorbing device of the present invention is made of thermoplastic polyurethane, it can be easily bonded to other component parts by heating and pressing.

3. Under a definite temperature, the shape of the resilient shock-absorbing device of the present invention can be altered as desired, including the ability to be bent to form any curve.

4. The present invention does not rely on an inflatable body for buffering, so that there is no problem of damage or leakage.

5. The present invention is provided with the cover layer 4, 6 to facilitate effects of cleaning, waterproofing, and breathability.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A resilient shock-absorbing device comprising:
an absorber body having top and bottom faces and including first and second absorber layers;
said first absorber layer having said top face and including a plurality of longitudinal resilient first outer tube halves of substantially arc-shaped cross section juxtaposed in parallel and heat-sealed to each other, a plurality of first heat-seal seams, and a plurality of first foam members filled respectively in said first outer tube halves and each having a surface exposed from a respective one of said first outer tube halves, each of said first outer tube halves having two transversely opposed first longitudinal ends contacting directly and respectively adjacent said first longitudinal ends of two adjacent said first outer tube halves, each of said first heat-seal seams extending longitudinally and interconnecting two adjacent said first longitudinal ends that contact each other;
said second absorber layer having said bottom face and including a plurality of longitudinal resilient second outer tube halves of substantially arc-shaped cross section juxtaposed in parallel and heat-sealed to each other, a plurality of second heat-seal seams, and a plurality of second foam members filled respectively in said second outer tube halves and each having a surface exposed from a respective one of said second outer tube halves, each of said second outer tube halves having two transversely opposed second longitudinal ends contacting directly and respectively adjacent said second longitudinal ends of two adjacent said second outer tube halves, each of said second heat-seal seams extending longitudinally and interconnecting two adjacent said second longitudinal ends that contact each other;
each of said first and second outer tube halves being made of a thermoplastic elastic material.

2. The resilient shock-absorbing device of claim 1, wherein said absorber body further includes a third absorber layer connected between said first and second absorber layers.

3. The resilient shock-absorbing device of claim 2, wherein said third absorber layer includes a plurality of juxtaposed resilient third outer tubes heat-sealed to each other, each of said third outer tubes receiving a third foam member and being made of thermoplastic polyurethane, each of said third outer tubes being heat-sealed to and being aligned with an adjacent one of said first outer tube halves and an adjacent one of said second outer tube halves in a top-to-bottom direction.

4. The resilient shock-absorbing device of claim 3, wherein each of said third foam members has a central hole that extends along the length thereof.

5. The resilient shock-absorbing device of claim 4, wherein said third absorber layer further includes a plurality of third inner tubes disposed respectively in said central holes of said third foam members, each of said third inner tubes being made of thermoplastic polyurethane, and having a hardness ranging from 55 ShoreA to 85 ShoreD.

6. The resilient shock-absorbing device of claim 2, wherein said third absorber layer includes a plurality of juxtaposed resilient third outer tube halves heat-sealed to each other, each of said third outer tube halves receiving a fourth foam member and being made of thermoplastic polyurethane, each of said third outer tube halves being heat-sealed to and being staggered with respect to an adjacent one of said first outer tube halves and an adjacent one of said second outer tube halves in a top-to-bottom direction.

7. The resilient shock-absorbing device of claim 1, wherein each of said first and second foam members has a density ranging from $0.2 \text{ g/cm}^3$ to $0.6 \text{ g/cm}^3$, and is made of a material selected from the group consisting of thermoplastic polyurethane (TPU), thermoplastic elastomer (TPE), polyurethane (PU), natural rubber, silicone rubber, and a combination thereof.

8. The resilient shock-absorbing device of claim 7, wherein each of said first foam members has said surface thereof provided with a first indentation that extends along the length thereof, and each of said second foam members has said surface thereof provided with a second indentation that extends along the length thereof.

9. The resilient shock-absorbing device of claim 8, wherein said first absorber layer further includes a plurality of first inner tube halves disposed respectively in said first indentations of said first foam members, said second absorber layer further including a plurality of second inner tube halves disposed respectively in said second indentations of said second foam members, each of said first and second inner tube halves being made of thermoplastic polyurethane, and having a hardness ranging from 55 ShoreA to 85 ShoreD.

10. The resilient shock-absorbing device of claim 1, further comprising a cover layer that envelops said absorber body.

11. The resilient shock-absorbing device of claim 10, wherein said cover layer is made of thermoplastic polyurethane, and has a hardness ranging from 55 ShoreA to 85 ShoreD.

12. The resilient shock-absorbing device of claim 1, wherein said thermoplastic elastic material is thermoplastic polyurethane, and each of said first and second outer tube halves has a hardness ranging from 55 ShoreA to 85 ShoreD.

13. The resilient shock-absorbing device of claim 1, wherein each of said first outer tube halves is heat-sealed to and is aligned with an adjacent one of said second outer tube halves in a top-to-bottom direction.

14. The resilient shock-absorbing device of claim 1, wherein each of said first outer tube halves is heat-sealed to and is staggered with respect to an adjacent one of said second outer tube halves in a top-to-bottom direction.

15. The resilient shock-absorbing device of claim 1, wherein said top face of said absorber body includes said surfaces of said first foam members which are exposed from said first outer tube halves, and said bottom face of said absorber body includes said surfaces of said second foam members which are exposed from said second outer tube halves.

16. The resilient shock-absorbing device of claim 1, wherein said bottom face of said absorber body includes said surfaces of said second foam members which are exposed from said second outer tube halves, and said top face of said absorber body includes surfaces of said first outer tube halves opposite to said surfaces of said first foam members which are exposed from said first outer tube halves.

* * * * *